United States Patent [19]
Terry

[11] 4,187,735
[45] Feb. 12, 1980

[54] HELICAL DRIVE TRAINS WHICH ELIMINATE THE NEED FOR THRUST BEARINGS

[76] Inventor: Clegia L. Terry, 2116 Curving Rd., Knoxville, Tenn. 37912

[21] Appl. No.: 931,555

[22] Filed: Aug. 7, 1978

[51] Int. Cl.² .............................................. F16H 57/00
[52] U.S. Cl. .......................................... 74/410; 74/432
[58] Field of Search ................. 74/414, 413, 458, 410, 74/427, 432

[56] References Cited
U.S. PATENT DOCUMENTS

| | | | |
|---|---|---|---|
| 415,044 | 11/1889 | Joslin | 74/440 |
| 1,989,663 | 2/1935 | Bethune | 74/466 |
| 2,982,146 | 5/1961 | Stoeckicht | 74/410 X |

*Primary Examiner*—C. J. Husar
*Assistant Examiner*—Conrad Berman
*Attorney, Agent, or Firm*—Pitts and Kesterson

[57] ABSTRACT

A method and apparatus for eliminating end thrust and consequently the need for thrust bearings in a helical drive arrangement is disclosed. According to this invention, a helical gear and a spur gear having the same pitch diameter and center of rotation are securely attached to each other and mounted to a shaft. This helical-gear spur-gear combination is meshed with a second similar helical-gear spur-gear combination supported on a parallel shaft. During operation the axial forces normally created by a helical gear drive are contained as the teeth of the two spur gears contact each other. Thus the need for end thrust bearings is eliminated.

8 Claims, 7 Drawing Figures

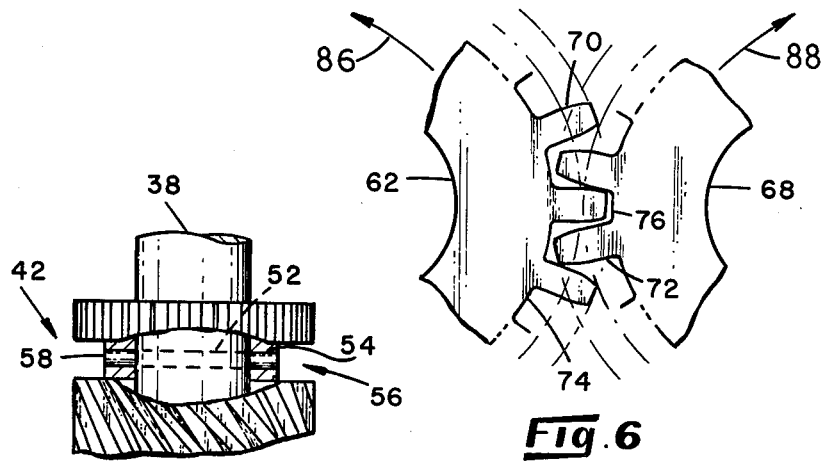
Fig.3
Fig.6
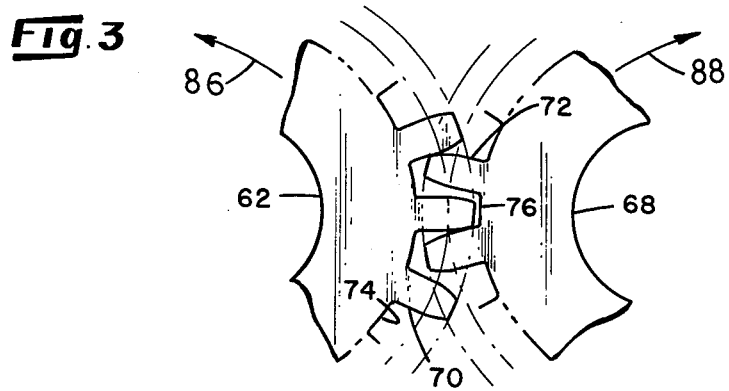
Fig.7
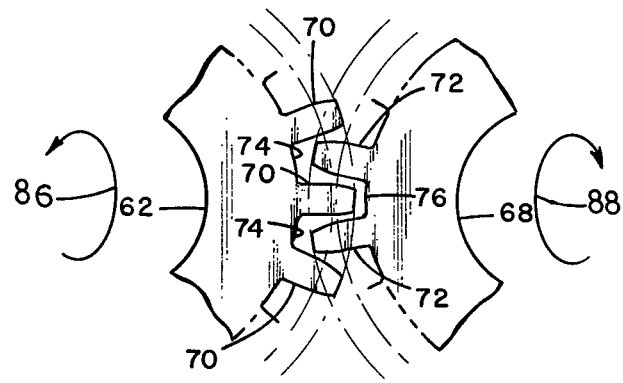
Fig.5

HELICAL DRIVE TRAINS WHICH ELIMINATE THE NEED FOR THRUST BEARINGS

BACKGROUND OF THE INVENTION

This invention relates to helical gears and more particularly to helical gears in combination with spur or straight toothed gears for purposes of eliminating axial force and consequently eliminating the need for thrust bearings.

As is well known and recognized by those skilled in the art, a pair of helical gears can be used to transfer power or force from one parallel shaft to another while providing considerable advantages over similar spur or straight toothed gears. For example, in regular spur gears the teeth come into contact along the entire face width and the contact is along the line parallel to the axis at all times. Parallel helical gears start contact at a point along one edge of the tooth and the contact progresses across the tooth width to the other edge of the tooth. The teeth therefore assume the load gradually, resulting in less impact and smoother operation. This gradual assumption of the load also results in the helical gear having greater strength than that of regular spur gears. As a result, helical gears can be operated at higher speeds or greater loads than equivalent spur gears, are quieter in operation and have less vibration. Because of these advantages, helical gears are preferred for use in heavy power transmission applications, heavy duty gear boxes and the like. Unfortunately, the use of helical gears has disadvantages as well as advantages. Since the force transmitted between the teeth of two meshing helical gears is always normal to the tooth surfaces, helical gears generate a component of force along the axis of the gear which causes end thrust. In presently available gearing applications, such end thrust is typically taken care of by the use of thrust bearings, and sometimes by the use of herring bone gears. Herring bone gears, as will be appreciated by those skilled in the art, comprise two helical gears of opposite hand (i.e. the direction of the helical is different for these two gears) mounted to each shaft. Thus, the axial or end thrust created by one-half of the herring bone gear is countered by the end thrust or axial force created by the helical gear having the opposite hand. Examples of herring bone gears are illustrated in U.S. Pat. No. 415,044 issued to W. Joslin on Nov. 12, 1889 and U.S Pat. No. 1,989,663 issued to J. Bethune on Feb. 5, 1935. Further discussions concerning herring bone gears and helical gears may be found on pages 427 through 432 of a book entitled "Kinematics and Dynamics of Machinery" by Robert L. Maxwell. This book was published in 1960 by Printice Hall Inc., Englewoods Cliffs, N.J. Additional information concerning herring bone gears and other helical gears may be found at pages 397 through 405 in a book entitled "Design of Machine Elements". This book was written by Virgel M. Faires and was published in 1965 by McMillan Company, New York, N.Y.

Unfortunately, end thrust bearings may not be suitable and cannot be used in all applications. Also, of course, end thrust bearings place an additional expense upon the design of a gear transmission train. Similarly, herring bone gears in general are also very expensive and require accurate alignment along the shafts they connect. In addition, herring bone gears are very difficult and sometimes substantially impossible to arrange and mesh in close quarters.

To overcome the shortcomings of these and other available methods of controlling end thrust in a power transmission train, it is an object of this invention to provide a method and apparatus which eliminates end thrust in a helical gear transmission train.

It is another object of this invention to provide a method and apparatus for eliminating the need of thrust bearings in a helical gear transmission train.

It is a further object of this invention to provide inexpensive and readily maintained apparatus for eliminating end thrust in a helical gear transmission train.

It is still another object of this invention to provide a method and apparatus that eliminates the need of a thrust bearing at both ends of a shaft supporting a helical gear in a transmission train in which the helical gear may be either the driving gear or the driven gear.

To accomplish the above mentioned objects, as well as other objects, which will become evident from the following drawings and detailed description, the present invention comprises a first helical gear which is securely and rigidly attached at a selected distance, to a spur or straight toothed gear having the same pitch diameter as the helical gear. The spur gear is positioned and attached to said helical gear such that its center of rotation or axis is the same as the center of rotation of said helical gear. The combination helical and spur gear are mounted on a common shaft such that rotation of the shaft results in rotation of the gear combination and visa versa. A second helical gear which has teeth suitable for meshing with the teeth of the first helical gear, but with a pitch direction opposite to that of the first gear is mounted on a shaft parallel to the shaft of the first helical gear. The shaft of the second helical gear is located at a distance from the shaft of the first helical gear such that the helical threads of both gears are properly meshed. A second spur or straight toothed gear is attached to the second helical gear such that its center of rotation or axis is the same as the center of rotation of the second helical gear. This second spur gear has a pitch diameter equivalent to the second helical gear and is located at a distance from the second helical gear such that its teeth are engaged or meshed with the teeth of the first spur gear. The teeth of the first and second spur gears are preferably designed such that the width of the teeth is less than the gap between the teeth. Thus, in operation, when a rotational force is applied to one of the shafts such that one of the helical gear is in a driving relationship with the other helical gear an axial force between the two helical gears (which is inherent when two helical gears are in meshing and driving relationship) will be experienced. This axial force results in an axial motion which will continue until the teeth of the two spur gears come into contact. As the teeth of the spur gears come into contact, axial motion of the spur and helical gear combination will cease even though the first helical gear and spur gear combination continues to drive the second spur gear and helical gear combination. Thus it is seen, that according to the technique of this invention, end thrust is eliminated and consequently the need for thrust bearings is eliminated.

Accordingly, the above mentioned objects and subsequent description will be more readily understood by reference to the following drawings wherein:

FIG. 3 shows a partial cross section view of another embodiment for fixedly mounting one of the helical-gear spur-gear combination on its supporting shaft by a pin through the shaft and the gear combination.

FIG. 5 shows the spur gear tooth relationship wherein the axial forces generated by the helical gear drive has not as yet resulted in tooth contact in the spur gears.

FIGS. 6 and 7 illustrate the teeth and gap relationship of the spur gears showing that the teeth of the two spur gears are in contact on only one side of each tooth face when a rotational force is applied in one direction and that the opposite side of the teeth are in contact when rotational force is applied in the opposite direction.

Figure 1:
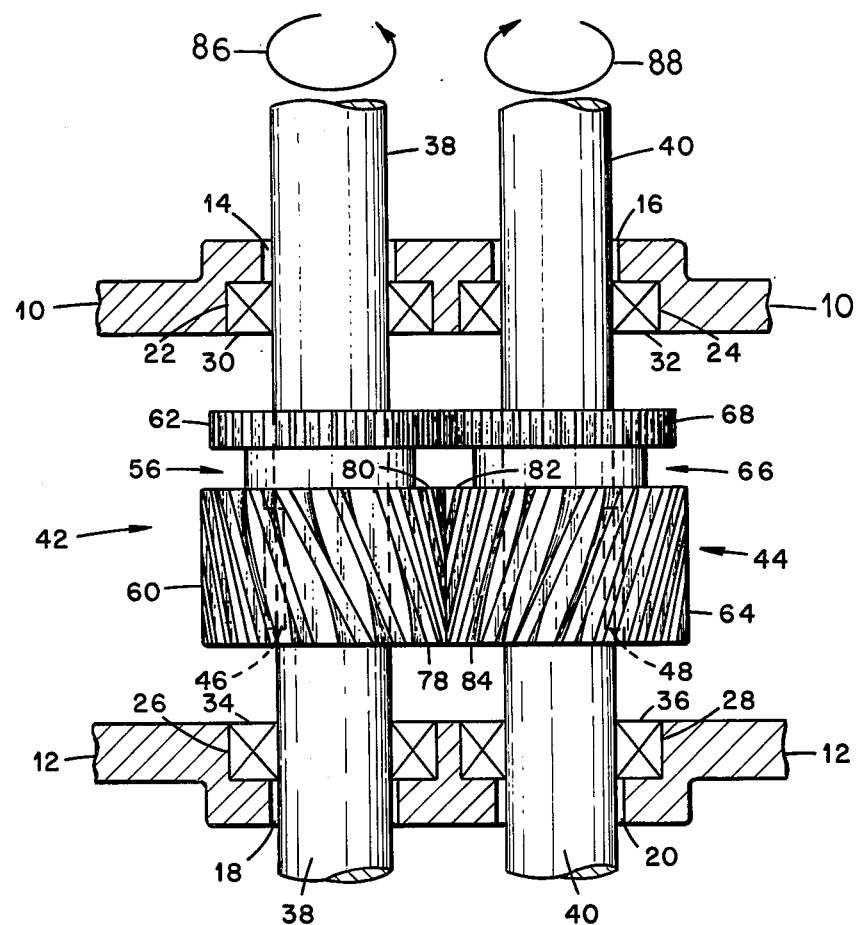
FIG. 1 is an elevation view of the helical-gear spur-gear combination of this invention in which no axial force has been experienced.
Figures 2, 4:
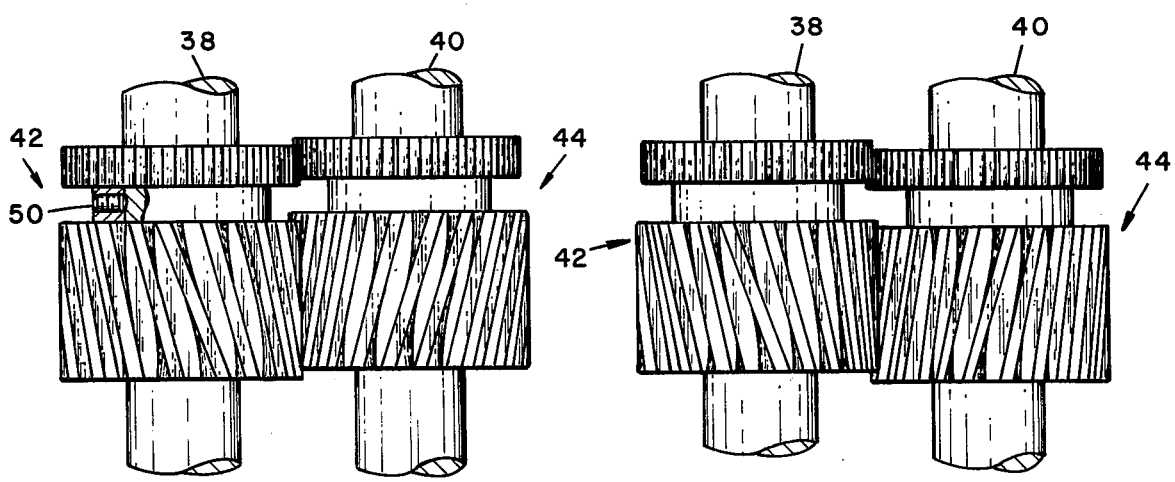
FIG. 2 illustrates the gear combination of FIG. 1 in operation wherein one of the helical spur gear combination is fixedly mounted to its supporting shaft by a set screw and the other helical-gear spur-gear combination has at least some freedom to travel on its support shaft in an axial direction.
FIG. 4 shows the gear combination of FIG. 2 wherein the direction or rotation of the drive shaft has been reversed.

Referring now to FIG. 1, there is shown supporting structures 10 and 12 having holes 14, 16, 18 and 20 therethrough. Also shown are depressions 22, 24, 26 and 28 which extend only part way through said support structure or housing 10 and 12. Depressions 22 through 28 typically are circular and have a common center as did holes 14, 16, 18 and 20 respectively. Pressed into holes 22 through 28 are bearings 30, 32, 34 and 36. As will be understood hereinafter, bearings 30 through 36 are suitable for supporting circumferential and horizontal loads but need not be of a type suitable for withstanding end thrust loads. Holes 14 and 18 as well as bearings 30 and 34 are carefully aligned to receive shaft 38. In a similar manner, shaft 40 passes through and is supported by bearings 32 and 36. Gear combination 42 is mounted to shaft 38 in such a manner that rotation of shaft 38 will result in rotation of gear combination 42. In a similar manner, gear combination 44 is mounted to shaft 40 in such a manner that rotation of shaft 40 will result in rotation of the gear combination 44. Also, of course, rotation of gear combinations 42 and 44 results in rotation of shafts 38 and 40. As will be discussed in detail, hereinafter, gear combination 42 and 44 both include a helical gear section and a spur or straight toothed section. In the embodiment shown in FIG. 1, mounting of gear combinations 42 and 44 on shafts 38 and 40 respectively is accomplished by a standard key arrangement such as is shown by reference numbers 46 and 48 which enables the gear combinations to move axially along their respective shafts. As is shown in FIG. 2, gear combination 42 is secured to shaft 38 by set screw 50 to prevent axial motion of gear combination 42 on shaft 38. It should be clearly understood at this time that set screw 50 is intended to prevent gear combination 42 from moving on shaft 38 due to gravity forces, vibration and other such minimal forces, and is not intended to prevent axial movement due to drive forces created by the helical gear sections of gear combinations 42 and 44. As will be understood hereinafter, securing gear combination 42 to shaft 38 for purposes of preventing axial motion of the gear combination of the shaft resulting from helical drive forces is not necessary since the unique combination of spur (straight toothed) and helical gears of this invention controls the axial forces normally encountered in a helical gear train and prevents them from sliding past each other. As was mentioned, heretofore, gear combination 44 is secured to shaft 40 such that rotation of one results in rotation of the other; however, it is not essential or even desirable that gear combination 44 be prevented from moving in an axial direction on shaft 40. In fact, as will become clear hereinafter, movement of gear combination 44 along axis 40 will be completely restrained by the meshing with gear combination 42.

FIG. 3 shows an alternate embodiment of attaching gear combination 42 to shaft 38. In this embodiment, a hole 52 is drilled through shaft 38. A matching hole 54 is drilled through the neck section 56 of gear combination 42 in such a way that a pin 58 may be pressed through hole 54 of the gear combination 42 and hole 52 of shaft 38.

Referring again to FIG. 1, it will be seen that gear combination 42 is comprised of a helical gear section 60, a neck section 56, and a spur or straight tooth gear section 62. Helical gear section 60 may be of any desired pitch diameter, may include any number of helical gear teeth 64, and, gear teeth 64 may be at any desired pitch angle. Spur gear or straight tooth gear 62 must have substantially the same pitch diameter as helical gear 60. However, spur gear 62 may have any desired number of teeth, and in no way needs to have the same number of teeth as helical gear 60. Neck section 56 should have a diameter no greater than the diameter of the helical and spur gear when measured at the root of the teeth. Neck section 56 does, however, have a minimum axial distance which separates helical gear 60 and spur gear 62. The separation distance between helical gear 60 and spur gear 62 is determined by the design of the tooth/gap ratio of spur gear 62 as will become apparent hereinafter. In a similar manner, gear combination 44 includes a helical gear section 64 which may be of any desired pitch diameter but, which must have helical teeth which properly mesh with helical gear section 60 of combination 42. Again as should be appreciated, although the illustration of FIG. 1 shows combination gear 44 having approximately the same pitch diameter as gear combination 42, such similarity in size is in no way required or necessary. Either gear combination 42 or 44 may be substantially larger or smaller than the gear it meshes with. However, since the gear combination is for force transmittal, it would be appropriate that the distance between the gear faces of helical gear section 64 be the same as the distance between the gear faces of helical gear 60. Similarly, neck 66 of gear combination 44 should be substantially the same as the neck distance of gear combination 42. Likewise, spur gear section 68 must have the same pitch diameter as helical gear section 64 and must have teeth which will properly mesh with spur gear section 62 of gear combination 42.

Referring now to FIG. 5, there is shown a top view of a section of the meshing of spur gear sections 68 and 62 in operation. As is shown in this diagram, teeth 70 of spur gear 62 are in a meshing relationship with teeth 72 of spur gear 68. However, as will also be seen in FIG. 5, gap 74 of spur gear 62 and gap 76 of spur gear 68 are larger than the cross section of teeth 70 and 72 of the respective spur gears. Further, as is shown in FIG. 5, teeth 70 of spur gear 62 are within the gap 76 and between the teeth of spur gear 68 in a non-contact relationship. Likewise, teeth 72 of spur gear 68 are in the gap 74 such that they do not make contact with teeth 70 of spur gear 62. As will be appreciated hereinafter, this non-contact arrangement will exist only temporarily when appropriate face surfaces 78 and 84 of helical gears sections 60 and 64 respectively are aligned. Once rotation of the helical gear combination and power transfer between one shaft and the other shaft commences, spur gears sections 62 and 68 will (depending upon the direction of the rotation and the direction of power being transferred from one shaft to the other) take on a tooth contact arrangement as shown in either FIG. 6 or FIG. 7.

To this point, the structure of the present invention has been described, the following paragraphs are with respect to the operation of the invention. As has been mentioned heretofore, gear combination and shaft 38 could either be the driven or the driving gear. However, for purposes of the following explanation it is assumed that gear combination 42 and shaft 38 are being driven by an outside driving force (not shown) in a rotational direction indicated by arrow 86. As will be appreciated, shaft 40 will be driven by gear combination 44 in the reverse direction as is indicated by rotational arrow 88. Now, assuming that the gears have an axial position such that the faces 78 and 84 of helical gear section 60 and 64 are aligned, then as was discussed earlier the teeth of spur gears sections 62 and 68 will be as is shown in FIG. 5. As rotation of shaft 38 and gear combination 42 commences, (and as is inherent in all helical gearing arrangements) an axial force will be created between helical gear section 60 and helical gear section 64. When the direction of rotation is as shown by rotational arrows 86 and 88 and when the driving gear shaft is 38 and the driven shaft is 40, this axial force will tend to push gear combination 42 down toward support 12 and push gear combination 44 up in an axial direction towards support 10. However, it will be recalled that although, as was shown in FIG. 2, gear combination 42 and gear combination 44 are secured to shaft 40 in such a manner that rotation of the gear combination results in rotation of their respective shafts there is no restraint at all upon the axial movement of gear combination 44 on shaft 40. Therefore, gear combination 44 will start moving up shaft 40. This movement will continue in a screw like motion until teeth 70 of spur gear 62 and teeth 72 of spur gear 68 come into contact with each other as is shown in FIG. 6. At the point contact is made, the screwing action must cease since after contact is made, all rotational movement of the teeth of gear 62 must result in an equivalent rotational movement of the teeth of gear 68 in the opposite direction. Thus, referring again to FIG. 2 it will be appreciated that gear combination 44 will move up shaft 40 in an axial direction until tooth contact is made between spur gear sections 62 and 68, and the relative position of gear combination 42 with respect to gear combination 44 is as shown. The distance face 84 of helical gear section 64 moves with respect to face 78 of helical gear section 60 depends on the size of the gaps 74 and 76 between the teeth of spur gears 62 and 68 with respect to the width of teeth 70 and 72. The larger the gap with respect to the tooth the larger the axial movement. However, it has been found that to facilitate assembly of the gear combination a large gap to tooth ratio may be desirable.

As another example, assuming the same direction of rotation of shafts 38 and 40, but further assuming that shaft 40 is now the driving shaft and shaft 38 is the driven shaft, it will be appreciated that the axial forces created will tend to drive gear combination 42 up the shaft towards support 10 and gear combination 44 down the shaft toward support 12 as is shown in FIG. 4. In addition, it will be appreciated that the meshing and contact of teeth 70 and 72 of spur gears 62 and 68 will be as is shown in FIG. 7.

Thus, there has been described to this point, a gearing combination which includes a pair of helical gears (which gears are recognized for their high power transmission capabilities) in combination with a pair of spur gears such that the axial forces which typically occur in helical gear driving arrangements are contained or controlled so that the need for end thrust bearings is eliminated.

It will be appreciated, of course, that the size of structural strength of helical gears 60 and 64 as well as spur gears 62 and 68 must be designed to withstand the forces created by driving the two shafts.

Thus, although the present invention has been described and illustrated with respect to specific helical and spur gear arrangements, it is not intended that such specific references and illustrations be considered limitations upon the scope of the invention except insofar as is set forth in the following claims.

What is claimed is:

1. A helical gear, spur gear drive combination for controlling end thrust comprising;
   a first support shaft;
   a first combination including a first helical toothed gear securely attached to a first straight toothed gear, said first helical toothed gear and said first straight toothed gear having a common pitch diameter and a common axis of rotation, said first combination being mounted on said support shaft such that rotation of said shaft results in rotation of said first combination and such that rotation of said first combination results in rotation of said first shaft;
   a second combination including a second helical toothed gear and a second straight toothed gear securely attached to each other, said second helical toothed gear and said second straight toothed gear having a common pitch diameter and a common axis of rotation, the teeth of said second helical gear having a pitch angle equal to and opposite that of the teeth of said first helical gear, and a tooth size and spacing such that teeth of said first and second helical gears may properly mesh, the teeth of said second straight toothed gear having a tooth size and spacing such that they may properly mesh with the teeth of said first straight toothed gear; and
   a second support shaft on which is mounted said second combination such that rotation of said second shaft results in rotation of said second combination and such that rotation of said second combination results in rotation of said second shaft, said second support shaft being located parallel and adjacent to said first support shaft such that the helical gear teeth and the straight toothed gear teeth of said first combination are in a meshing relationship with the helical gear teeth and the straight toothed gear teeth of said second combination, respectively.

2. The helical-gear, spur-gear drive combination of claim 1 and further comprising means for securing said first combination to said first shaft to prevent axial movement of said first combination on said first shaft due to vibration, gravity and other forces which are less than the axial forces generated by the operation of said first and second helical toothed gears.

3. The helical-gear, spur-gear drive combination of claim 2 wherein said second combination is free to move in an axial direction along said second shaft.

4. The helical-gear, spur-gear drive combination of claims 1 or 2 wherein the gap separating the teeth of said first and second straight toothed gears is larger than the width of said teeth such that said first and second straight toothed gears may be in a meshing relationship without the teeth of said first straight toothed gear being in contact with the teeth of said second straight toothed gear.

5. A method of transmitting power from a driving shaft to a driven shaft comprising the steps of:
   securely attaching a first helical toothed gear having a first pitch diameter to a first straight toothed gear having a pitch diameter equal to said first pitch diameter gear such that said first helical toothed gear and said first straight toothed gear have a common axis of rotation;
   providing a first and second support shaft;
   mounting said first helical toothed gear and said first straight toothed gear to said first support shaft such that rotation of said first support shaft causes rotation of said first helical toothed gear and said first straight toothed gear, and such that rotation of said first helical toothed gear and said first straight toothed gear causes rotation of said first support shaft;
   securely attaching a second helical toothed gear having a second pitch diameter to a second straight toothed gear having a pitch diameter equal to said second pitch diameter such that said second helical toothed gear and said second straight toothed gear have a common axis of rotation; the teeth of said second helical toothed gear and said second straight toothed gear being suitable for meshing with said first helical toothed gear and said first straight toothed gear respectively;
   mounting said second helical toothed gear and said second straight toothed gear to said second support shaft such that rotation of said second support shaft causes rotation of said second helical toothed gear and said second straight toothed gear, and such that rotation of said second helical toothed gear and said second straight toothed gear causes rotation of said second support shaft; and
   positioning said second support shaft parallel to said first support shaft at a distance such that said first helical gear and said first straight toothed gear are in a meshing relationship with said second helical toothed gear and said straight toothed gear respectively.

6. The method of claim 5 and further comprising the step of securing said first helical toothed gear and said first straight toothed gear to said first support shaft to prevent axial motion due to vibration, gravity and other forces which are less than the axial forces generated by the operation of said first and second helical toothed gears.

7. The method of claim 6 wherein said second helical toothed gear and said second straight toothed gear are free to move in an axial direction along said second support shaft.

8. The method of claims 5 and 6 further comprising the step of spacing said teeth of said first and second straight toothed gears such that said space between said teeth is larger than the width of said straight teeth.

* * * * *